(12) United States Patent
Sleboda et al.

(10) Patent No.: US 7,049,982 B2
(45) Date of Patent: May 23, 2006

(54) VEHICLE INFORMATION DISPLAY AND COMMUNICATION SYSTEM HAVING AN ANTENNA ARRAY

(75) Inventors: Pawel W. Sleboda, Bloomfield Hills, MI (US); Thomas J. LeMense, Farmington, MI (US)

(73) Assignee: Lear Corporation, Southfield, MI (US)

( * ) Notice: Subject to any disclaimer, the term of this patent is extended or adjusted under 35 U.S.C. 154(b) by 153 days.

(21) Appl. No.: 10/749,895

(22) Filed: Dec. 31, 2003

(65) Prior Publication Data

US 2005/0146445 A1 Jul. 7, 2005

(51) Int. Cl.
*G08G 1/123* (2006.01)

(52) U.S. Cl. .............................. 340/995.27; 340/995.1; 340/988; 340/990; 340/539.1; 701/200

(58) Field of Classification Search ........... 340/995.27, 340/995.1, 901, 988, 990, 426.16, 426.19, 340/539.1, 539.21; 701/200, 215, 219, 213, 701/301; 359/838, 871, 872

See application file for complete search history.

(56) References Cited

U.S. PATENT DOCUMENTS

| | | | | |
|---|---|---|---|---|
| 4,867,498 | A | 9/1989 | Delphia et al. | 296/37.7 |
| 5,323,321 | A | 6/1994 | Smith, Jr. | 364/449 |
| 5,555,172 | A | 9/1996 | Potter | 364/424.01 |
| 6,125,030 | A | 9/2000 | Mola et al. | 361/681 |
| 6,257,745 | B1 | 7/2001 | Speth et al. | 362/488 |
| 6,420,975 | B1 * | 7/2002 | DeLine et al. | 340/815.4 |
| 6,539,306 | B1 * | 3/2003 | Turnbull | 701/219 |
| 6,678,614 | B1 * | 1/2004 | McCarthy et al. | 701/213 |
| 2002/0032510 | A1 | 3/2002 | Turnbull et al. | 701/49 |
| 2003/0025793 | A1 | 2/2003 | McMahon | 348/148 |
| 2003/0075955 | A1 | 4/2003 | Tiesler et al. | 296/214 |
| 2003/0169522 | A1 | 9/2003 | Schofield et al. | 359/876 |
| 2004/0032675 | A1 * | 2/2004 | Weller et al. | |

FOREIGN PATENT DOCUMENTS

| | | |
|---|---|---|
| EP | 0 675 341 A1 | 10/1995 |
| JP | 2003269990 A | 9/2003 |
| JP | 2003273625 A | 9/2003 |
| WO | WO 02/35646 A1 | 5/2002 |

* cited by examiner

*Primary Examiner*—Hung Nguyen
(74) *Attorney, Agent, or Firm*—Bill Panagos (57) ABSTRACT

The present invention provides a vehicle information display and communication system having a plurality of operative modules, the system includes a control processing unit adapted to provide an interface among the plurality of operative modules. The operative modules include a display module adapted to provide visual information to the occupants of the vehicle, a navigation module adapted for global positioning satellite reception to provide vehicle position information to the control processing unit, and a telecommunications module adapted for wireless communication to provide communication between the control processing unit and a wireless telecommunications network and between the control processing unit and any one of a plurality of local wireless devices. The system further includes a local network interface module adapted to provide communication between a vehicle control bus and the control processing unit, and an antenna array including a GPS antenna mounted in an overhead console, the overhead console adapted to extend forward over the upper edge of the vehicle windshield such that GPS antenna maintains line-of-sight with at least one global positioning satellite transmitter at all times.

17 Claims, 5 Drawing Sheets

Figure 1

| 80 | NW | Sept. 24th 11:54 | Alt. 1000 ft | Outside temp. 20° F/ ICE | 82 |

| Inst mpg | 5 | Vehicle Warnings & Health Status | |
|---|---|---|---|
| Ave mpg | 25 | | |
| Dist to empty | 280 mi | | SRS: ON |

84

| Gasoline | Exit | Dist | Time |
|---|---|---|---|
| Phillips 66  24hr | 265a | 4.2 | 3m |
| Texaco | 265a | 4.2 | 3m |
| Amoco | 280 | 19.2 | 15m |

86

| Food | Exit | Dist | Time |
|---|---|---|---|
| Burger King 24hr | 265a | 4.2 | 3m |
| Taco Bell | 265a | 4.2 | 3m |
| Denny's     24hr | 280 | 19.2 | 15m |

88

| Lodging | Exit | Dist | Time |
|---|---|---|---|
| Hampton Inn | 265a | 4.2 | 3m |
| Holiday Inn | 265a | 4.2 | 3m |
| Motel 6 | 280 | 19.2 | 15m |

90

| Hospital/Medical | Exit | Dist | Time |
|---|---|---|---|
| St. John's Hosp | 265a | 4.2 | 3m |
| Mt. Sinai Grace | 265a | 4.2 | 3m |
| Lourdes Trauma C | 280 | 19.2 | 15m |

92

| Destination Environs | Rte | Dist | Time |
|---|---|---|---|
| Southside Mall | S45 | 4.2 | 3m |
| Wild Safari Zoo | I72 | 12.2 | 12m |
| CarnegieMuseum | S22 | 19.7 | 16m |

VEHICLE INFORMATION DISPLAY AND COMMUNICATION SYSTEM HAVING AN ANTENNA ARRAY

BACKGROUND OF THE INVENTION

1. Field of the Invention

The present invention relates, generally to an information display and communication module for a vehicle and, more specifically, to an electronic vehicle information display system employed with an antenna array housed in an overhead console.

2. Description of the Related Art

Integrated vehicle information, monitoring, and control systems are becoming increasingly popular in passenger vehicles. In fact, the complexity of these systems and the variety of the associated technology that can be combined within a vehicle information system is becoming almost limitless. Currently, systems are available that incorporate navigation, roadside information, telecommunication, voice and speech interaction, and vehicle monitoring and health status. The navigation systems available and integrated into the vehicle most often include a global positioning system (GPS) receiver that is mounted permanently within the vehicle and communicates with a satellite-based GPS to receive vehicle position information. Typically, the GPS information is converted into some form of display for the vehicle operator. Some vehicles offer map displays that use the GPS information to indicate the position of the vehicle relative to previously determined reference points or other known landmarks from a map database. The GPS information may also be utilized as a navigation or route-guidance system to provide driving directions on-route to assist the driver in arriving at the chosen destination. Still other navigational assistance functions are available such as providing maps regarding places and items of interest in the area surrounding the vehicle's location or a chosen destination.

Additionally, the incorporation of a telecommunication interface into vehicle information systems has taken on a number of different forms as mobile, cellular phone system technology has evolved and improved. Some of the existing vehicle information systems maintain a mobile cellular phone system that is integrated into the vehicle. This can provide a hands-free telecommunication link for the vehicle occupants but generally requires a dedicated, or fixed, cellular phone with its own number. The latest telecommunication systems that are integrated in vehicle information systems employ "Bluetooth™" technology. Bluetooth provides short-range wireless radio frequency (RF) intercommunication between mobile devices such as phones, PDAs, laptop computers, and the like. Bluetooth thereby allows these portable devices of the driver or other occupants to interface with the vehicle. In this manner, the vehicle information system may connect to an occupant's mobile phone so that calls and text messaging are routed through the vehicle information system.

Some vehicle information systems also employ a separate microwave antenna to boost the cellular connection outside the vehicle for the Bluetooth connected devices. Further, the navigational database that the vehicle information system employs may be updated by the cellular telecommunication link. Also, as a portion of the telecommunications interface, some vehicle information systems incorporate RF modules that can program and control vehicle alarm and keyless entry as well as garage door openers and other remote interfaces, as well as separate receivers for various radio and television formats. A number of the conventional vehicle information systems also employ voice recognition capability to provide the occupants the opportunity to give the system voice commands in addition to direct keypad inputs. In addition, speech synthesizers are able to take digital outputs from the vehicle information system and vocalize them. The voice and speech interaction capabilities are typically integrated to work with all the other sub-systems so that voice control of navigation, telecommunication, and the other systems is available. Further, most current vehicle information systems provide outputs regarding the status and health of the vehicle's s mechanical and electrical systems. For example, in addition to the more common driving concerns such and fuel quantity and usage, engine temperature, oil pressure and charging system status, information may also be provided regarding engine fault conditions, restraint system readiness, and tire pressure if the vehicle is so equipped. In some examples, vehicle comfort and safety settings, such as seat positions, stereo controls, cabin temperature controls, and headlight settings are also programmable through the information system. With the integration of all of the sub-systems, some vehicles are capable of reporting vehicle difficulties or emergency situations back to a monitoring facility.

However, regardless of how sophisticated and all encompassing the conventional vehicle information systems have become, they are all still bound by the physical requirements and limitations of the various sub-systems, and more specifically the requirements and limitations of the key systems, navigation and telecommunication. More precisely, the navigational and telecommunication integration is what make these vehicle information systems useful tools that extend beyond the boundary of the vehicle itself, and it is these particular systems that are most problematic to incorporate. In particular, GPS information is received from the satellite system to identify the present position of the vehicle. This communication is exchanged by line-of-sight, meaning that the vehicle's GPS antenna must be placed to achieve the greatest skyward exposure. Similarly, the microwave mobile telecommunication antenna must be placed in the vehicle to prevent interference between the antenna and the various microwave towers that route the signal to the vehicle. If GPS line-of-sight is not maintained, the navigation system is inaccurate until it can regain the satellite signal. If the vehicle information system is using the microwave antenna and the signal is disrupted, data will be lost or communication terminated. Additionally, other antennas may also be required depending on the other features included.

Conventional vehicle information systems use a variety of antenna placements to attempt to overcome the line-of-sight requirements, and if vehicle styling and aerodynamics were not of great concern, this would generally not present a problem. Clearly, the easiest antenna solution to support the navigation and communications interfaces of the conventional vehicle information systems would be to place an antenna array in the center of the vehicle's roof at it highest point. However, this purely technical approach would destroy the aesthetic visual appeal of the vehicle, which is a quality vehicle manufacturers work hard to provide to the generally style conscious public. Additionally, as most vehicles today are designed with aerodynamics and fuel efficiency in mind, having an antenna array placed in the wind stream anywhere on the vehicle's outer surface is a disadvantage.

Partially in response to this issue, manufacturers have placed antennas in the upper channels along the tops of the vehicle doors, in the channels along the trunk edge, in the weather strip areas along the windshield and rear window glass, and even in the rear view mirror housing. Using these methods of antenna placement presents a number of tradeoffs. In the channel and weather strip installations, the antennas are limited by size and shape the shape and size of the areas they are confined to, and they still suffer periods of vehicle orientation that will block the line of sight requirements. Further, they must electrically interact with their metallic surroundings, which generally present other signal interference issues. Housing one or more of the antennas in the rear view mirror assembly offers some improvement over the placements, but the antennas are still is located in the vehicle in an area that is partially blocked by the forward roof line. Also, rear view mirror antenna placements are subject to being reoriented when different drivers relocate the alignment of the mirror assembly, which causes navigational reference difficulties.

Accordingly, there remains a need in the art for a vehicle information display and communication system that provides full line-of-sight antenna placement for the GPS and microwave antennas, and any other antenna assemblies that would benefit from maximum skyward exposure. Additionally, the operative antenna placement should be generally concealed and aesthetically neutral so as to not negatively impact the styling, appearance, or aerodynamics of the vehicle.

SUMMARY OF THE INVENTION

The disadvantages of the related art are overcome by the present invention of a vehicle information display and communication system. The system has a plurality of operative modules and includes a control processing unit adapted to provide an interface among the plurality of operative modules. The operative modules include a display module adapted to provide visual information to the occupants of the vehicle, a navigation module adapted for global positioning satellite reception to provide vehicle position information to the control processing unit, a telecommunications module adapted for wireless communication to provide communication between the control processing unit and a wireless telecommunications network and between the control processing unit and any one of a plurality of local wireless devices, and a local network interface module adapted to provide communication between a vehicle control bus and the control processing unit. Further, the present invention has an antenna array including a GPS antenna mounted in an overhead console, the overhead console adapted to extend forward over the upper edge of the vehicle windshield such that the GPS antenna maintains line-of-sight with at least one global positioning satellite transmitter at all times.

Thus, by having an antenna array that is housed in an overhead console and exposed skyward through the upper portion of the windshield, the present invention provides a vehicle information display and communication system that maintains constant contact with the GPS navigational reference, microwave communication, and all other forms of interactive communication that are installed in the vehicle. Further, the placement of the antenna array is such that it is unobtrusive, generally hidden, and does not extend into the outer surface of the vehicle, thereby preserving the vehicle's styling and aesthetics.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
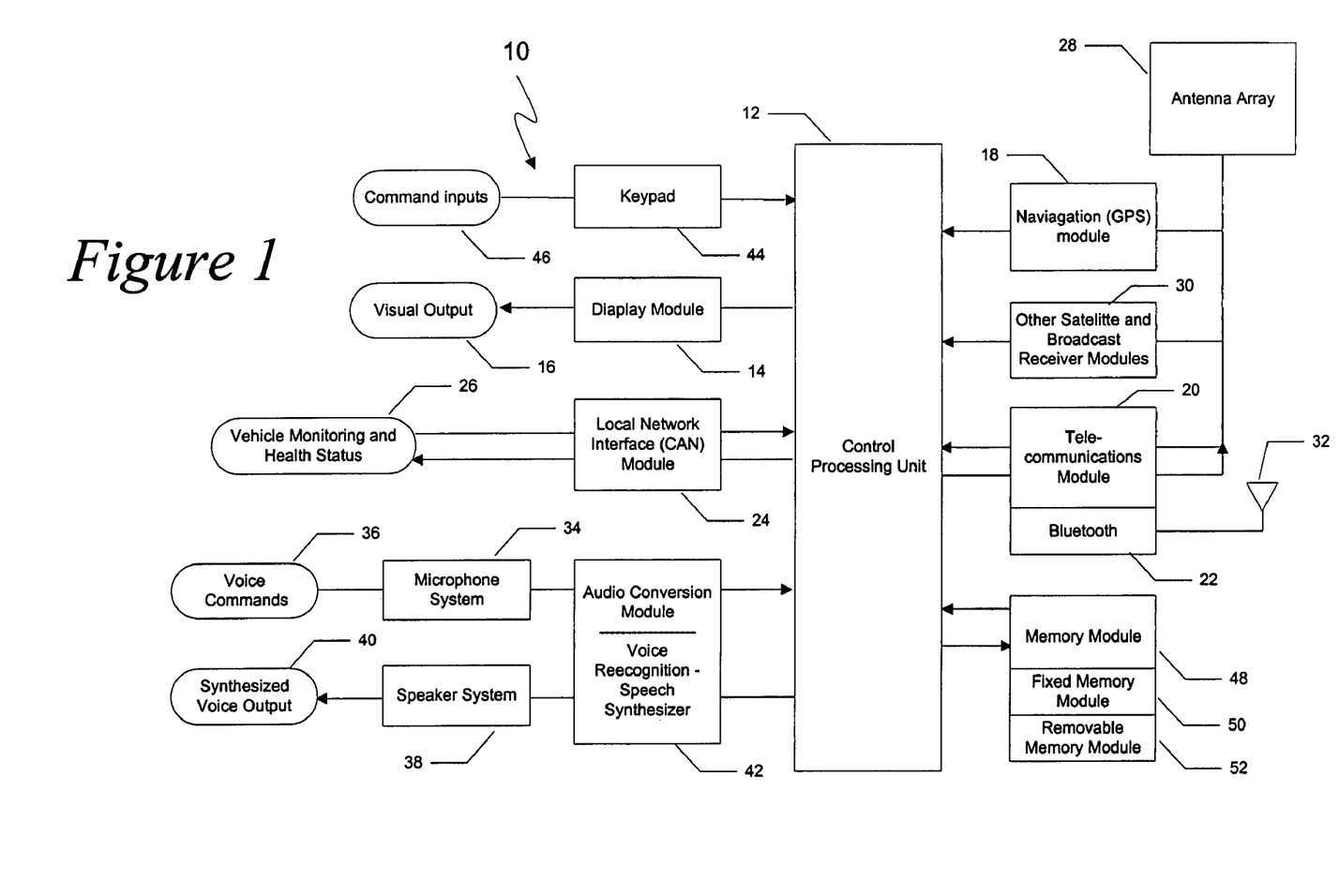
FIG. 1 is a block diagram of the vehicle information display and communication system of the present invention.

Referring now to the drawings, where like numerals are used to designate like structure throughout the figures, a block diagram of the vehicle information and display system of the present invention is generally indicated at 10 in FIG. 1. The vehicle information and display system 10 has a plurality of operative modules. The system 10 also includes a control processing unit 12 that is adapted to provide an interface among the plurality of operative modules. The operative modules include a display module 14 that is adapted to provide visual information to the occupants of the vehicle as shown by visual output block 16. A navigation module 18 is adapted for global positioning satellite reception to provide vehicle position information to the control processing unit 12. A telecommunications module 20 is adapted for wireless communication to provide an interface between the control processing unit 12 and a wireless telecommunications network (i.e. Sprint, AT&T, Nextel, etc). The telecommunication module 20 also provides an interface between the control processing unit 12 and any one of a plurality of local wireless devices, such as PDAs, laptop computers, and cellular phones. This is accomplished by the addition of a short-range wireless RF transceiver module that operatively employs the Bluetooth standard telecommunication protocol. Further, a local network interface module 24 is also included that is adapted to provide communication between a vehicle control bus and the control processing unit 12. The local network interface module 24 is a local area network transceiver that operatively employs the CAN communication protocol. The local network interface module 24 retrieves vehicle monitoring and health status information from the vehicle's local CAN data bus, as shown by the representative vehicle monitoring and health status block 26.

Additionally, as will be discussed in greater detail below, an antenna array 28 which includes a GPS antenna is mounted in an overhead console and is in electrical communication with the navigation module 18, the telecommunications module 20, and any additional receiver modules that are represented herein by block 30. It should be appreciated that the antenna array 28 may also include the antenna used for Bluetooth interface with the short-range RF devices, shown as 32 in FIG. 1. This is not strictly necessary since those devices enter into Bluetooth communication once inside the vehicle. It should be further appreciated that the present invention is not limited to incorporating only the types of systems named herein. As indicated at block 30, the present invention may also include the integration of other types of receiver systems for use within the vehicle, such as satellite radio and television.

As will be discussed below, to appropriately house the antenna array 26 in accordance with the teachings of the present invention, an overhead console is adapted to extend forward over the upper edge of the vehicle windshield such that the GPS antenna maintains line-of-sight with at least one global positioning satellite transmitter at all times. The antenna array 28 further includes a microwave antenna that operatively communicates with a cellular network using a standard cellular mobile communication format. It should be appreciated that due to the modular nature of the present invention, the system may be operatively made designed to include different stages of complexity and features. This would likely be a cost driven concern and may be left to the end user as to which modules to include in the system. Thus, if the vehicle's information display and communication system is so equipped, the antenna array 28 will also include an antenna that operatively receives a standardized communications format to provide satellite radio reception, and an antenna that operatively receives a standardized communications format to provide television reception.

However, the preferred embodiment of the present invention includes the largest assortment of options and features which further includes a microphone system 34 adapted to receive voice signals or commands (shown as block 36) from the vehicle occupants, a speaker system 38 adapted to generate audio signals (shown as block 40) from the control processing unit 12, and an audio conversion module 42 having a voice recognition circuit and a voice synthesizer circuit. The voice recognition circuit is adapted to receive voice commands 36 from the microphone system 34, recognize particular predetermined voice commands as being one of a group of predetermined commands and to pass the recognized commands to the control processing unit 12. The voice synthesizing circuit is adapted to process signals from said control processing unit 12 and synthesize the signals into intelligible audio (voice) output signals and to pass the voice output signals to the speaker system 38. When voice recognition and speech synthesis is not desired, or chosen as an installed option, the system 10 may be operated through the use of the keypad 44. As will be discussed below, the use of the keypad 44 allows command inputs (shown as block 46) to be entered into the system by causing the display module 14 to activate, which generates a series of menus and interactive display outputs 16. In reference to the visual display module 14, in the preferred embodiment the display module 14 is mounted in the overhead console and further includes a vacuum fluorescent display unit as its visual output device.

To support the operating functions of the vehicle information display and communications system of the present invention, the control processor unit 12 further includes a memory module 48. The memory module 48 is adapted to provide the necessary memory storage space for the control processing unit 12 to operatively control the processes of the plurality of modules and to store a navigational database. The navigational database may be stored in the memory module 48 by downloading the navigation database from an outside source through a wireless telecommunication connection as supported by the telecommunication module 20.

The memory module 48 further includes a fixed portion 50 and a removable portion 52, the removable portion 52 is adapted to be interchangeable with like removable portions so as to allow the use of different removable memory portions (modules) having different stored navigational databases. The removable memory portion 52 is further adapted to be interchangeable with like removable portions to allow a change in the size of the available memory.

It should be appreciated that other support elements may be necessary for the system 10 to function, such as a separate power supply and signal filtering and pre-processing circuits, for example. However, these items are not germane to the specific functions of the modular portions of the system 10 as generally illustrated in the block diagram of FIG. 1 and are therefore not included as a part of this discussion.

Figure 2:
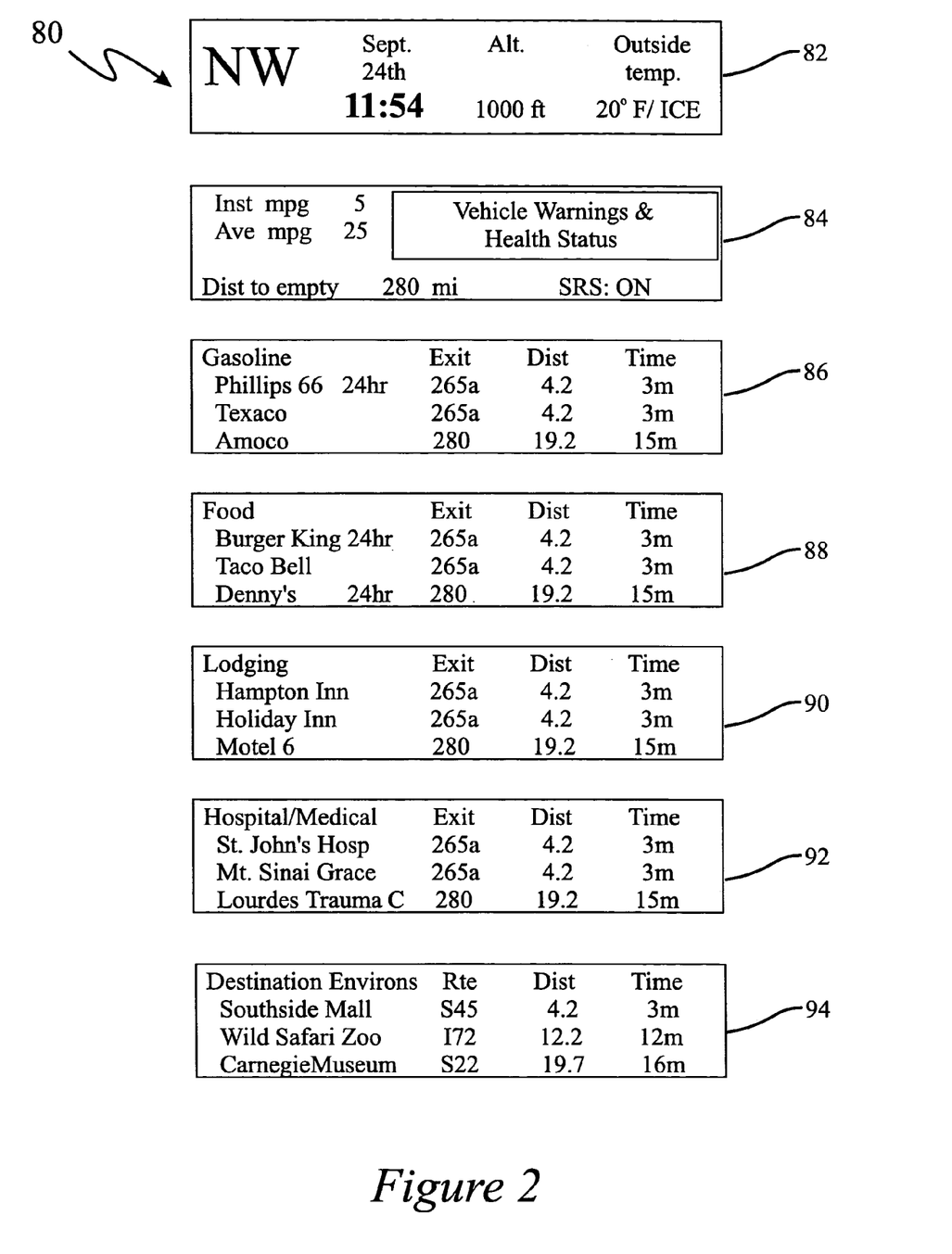
FIG. 2 is a representation of a number of examples of visual outputs from the display module of the present invention.

As generally indicted at 80 in FIG. 2 illustrates a series of display outputs from the display module 14. It should be appreciated that trough the use of the stored navigational database any variety of displays presenting a wide variety of information. A basic display for the preferred embodiment of the present invention is illustrated at 82. Display output 82 indicates the general heading of the vehicle, the date and time, the local altitude, and the immediate weather conditions. The basic display may be altered to indicate latitude and longitude in addition to compass heading if desired. Display output 84 is one of a variety of selectable displays that indicate instantaneous mileage, average mileage, distance to empty, and vehicle monitoring and health status indications. The vehicle monitoring and health status indications may include a variety of particulars such as tire pressure, engine fluid states and temperatures and other system statuses.

Display outputs 86 through 92 indicate route and distance information from the vehicle's present position to gasoline, food, lodging, and medical facilities. Display output 94 indicates points of interest in the environs of the chosen destination. It should be appreciated that it is required that a particular destination be programmed into the system 10 before this information display is available, and that the type of environ information that is displayed is also programmable and selectable. It should be further appreciated that these displays illustrated here are not exhaustive and any number of additional display outputs may be generated from the information available to the vehicle information display and communication system 10.

Figure 3:
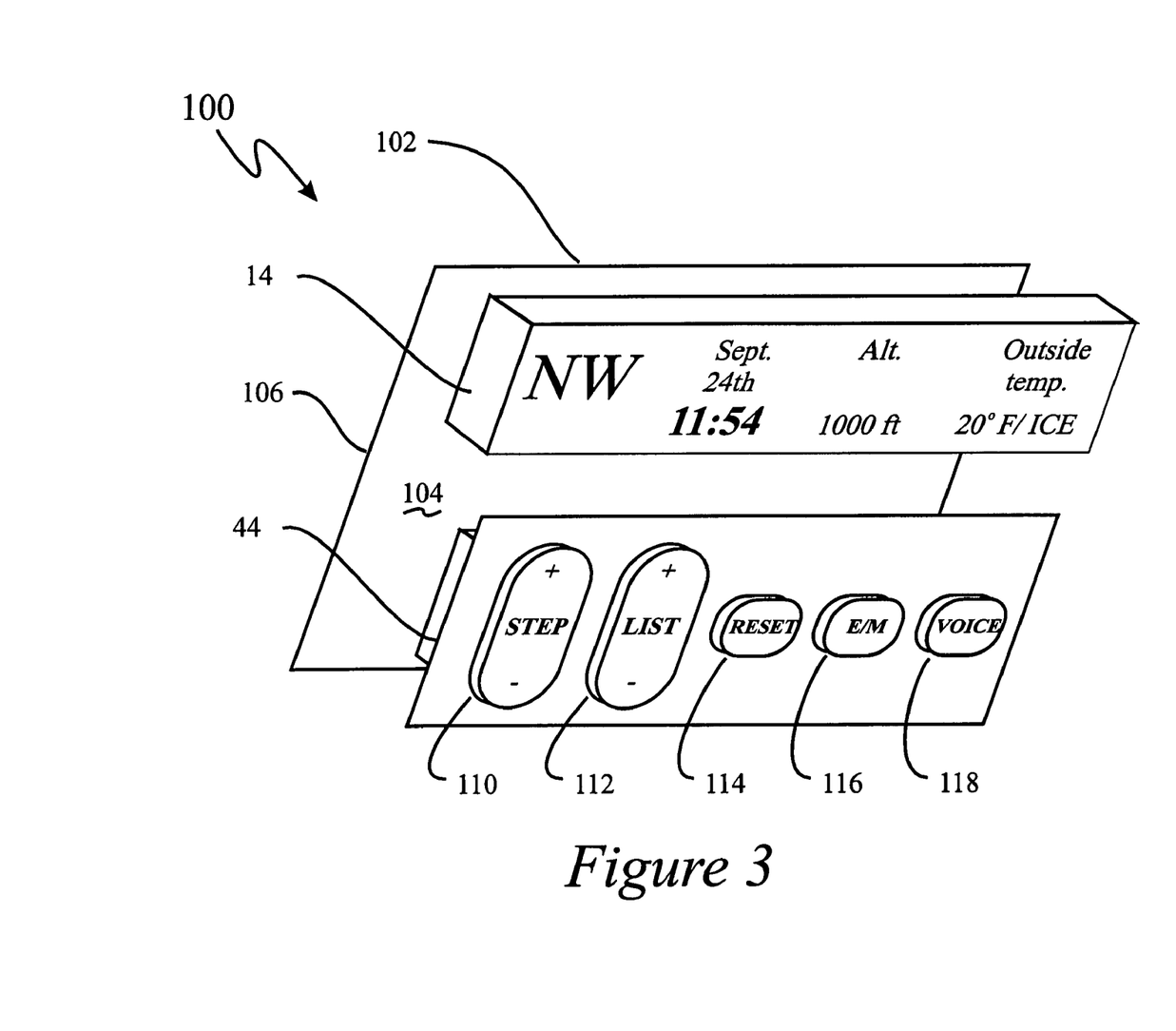
FIG. 3 is a perspective view of one example of the display module and keypad of present invention.

A vehicle information display and communication system circuit board is generally indicated at 100 in FIG. 3. In the preferred embodiment of the present invention, the display module 14 and keypad 44 are mounted to the front face 104 of a printed circuit board 102, so that the system 10 may be installed in an overhead console. The other modules of the system 10 (not shown in FIG. 3) are mounted to the rear face 106 of the circuit board 102 so that they are supported on the circuit board and mounted within the overhead console with the display module 14 and keypad 44. The keypad 44 provides interaction with the system 10 by the individual keys as illustrated. The Step key 110 steps through the various displays as provided by the List key 112. The List key 112 scrolls through option menus related to navigational database and the types and choices of information to be displayed. The List key 112 in combination with the Step key 110 also provides the ability to enter a destination. The Reset key 114 provides the ability to reset various stored and programmable information that is shown on the display module 14 by the use of the List and Step keys 112 and 110. The E/M key 116 toggles the display units between English and Metric units, and the Voice key 118 toggles voice recognition and speech synthesis on and off. It should be appreciated that the display module 14 and the keypad 44 need not be place together on the circuit board 102 and may be placed in other locations within the vehicle as long as the antenna array 28 is housed within the extended portion 136 of the overhead console 130.

Figure 4:
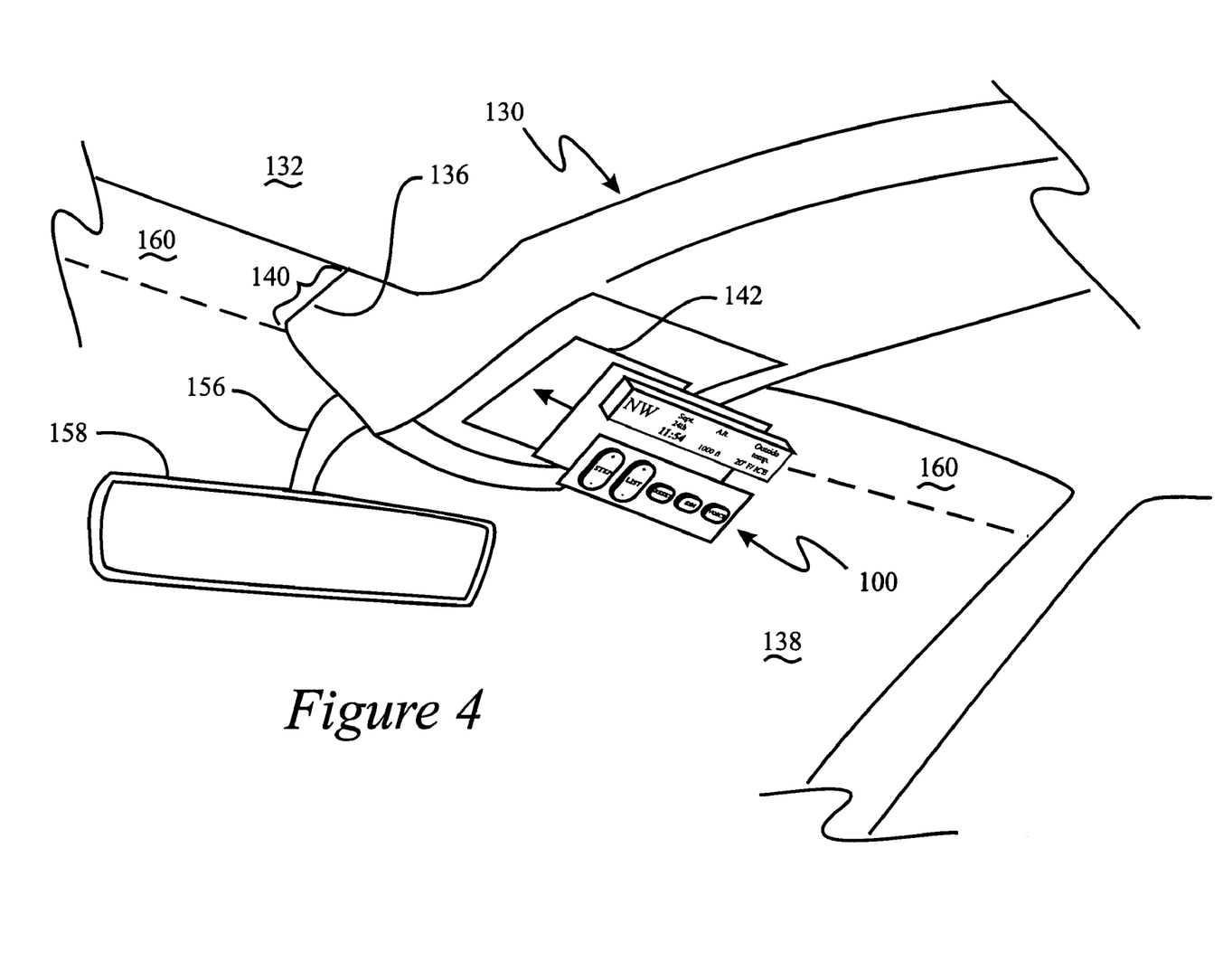
FIG. 4 is a perspective view of one example of an overhead console adapted to employ the antenna array and display module of the present invention.
Figure 5:
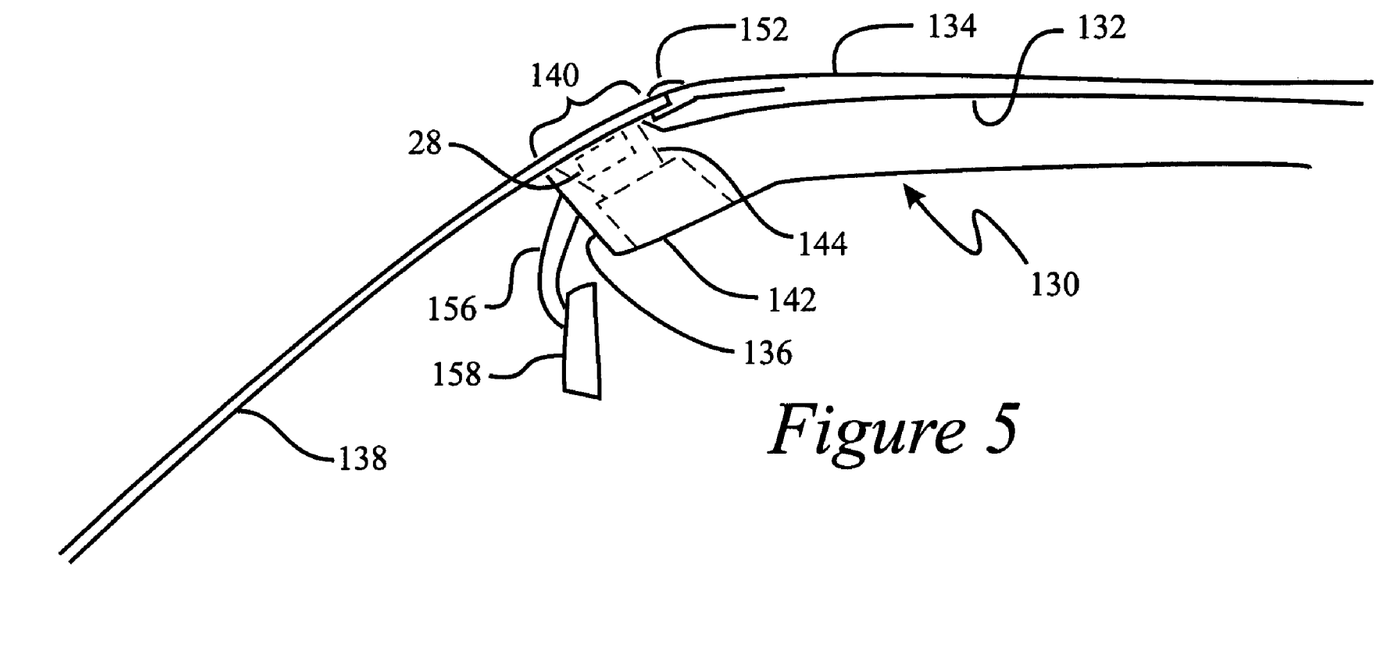
FIG. 5 is a cross-sectional side view of the interface between the windshield and overhead console that houses the antenna array and display module of the present invention.

As illustrated in FIGS. 4 and 5, an overhead console of the type employed for housing the antenna array 28 and the vehicle information display and communication system circuit board 100 of the present invention is generally indicated at 130. The overhead console 130 is mounted to the vehicle's headliner 132 in a conventional manner. The headliner 132 is further mounted to the interior side of the vehicle's roof 134. The overhead console 130 includes an extended portion 136 that continues forward beyond the headliner 132 out over a portion of the top the vehicle windshield 138. The portion of the windshield 138 over which the extended portion 136 of the overhead console covers is indicated as 140. The overhead console 130 includes an open recess 142 in which the vehicle information display and communication system circuit board 100 is received and mounted. The overhead console 130 has a skyway facing opening 144 that is connected to open recess 142 through the body of the overhead console. The skyward facing opening 144 allows the mounting of the antenna array 28, such that the antennas of the array are constantly presented with a skyward orientation. Furthermore, as illustrated in FIG. 5, the overhead console 130 of the present invention provides the antenna array 28 with a full-time skyward exposure while housing the array within the vehicle interior and thereby avoiding any impact upon the shape, the aesthetics, or the styling of the vehicle. Thus, the placement of the antenna array 28 within the overhead console 130 isolates the antennas from any metallic portions of the vehicle body 134 and its associated trim pieces as shown at 152.

It should be appreciated that the greater the slope of the windshield 138 at the upper portion 140, the greater the skyway exposure for the antennas of the array 24, however, this is a vehicle design consideration and beyond the scope of the present invention. It should be further appreciated; the overhead console 130 of the present invention may also be adapted to provide a mounting for the arm 156 of the rearview mirror 158. However, this is also a vehicle design consideration and the rearview mirror arm 156 may be alternately mounted directly to the windshield 138 in the conventional manner.

In regard to the antenna array 28, the included antennas may take on any number of forms and easily fit within the overhead console 130 to achieve a maximum skyward exposure through the skyward facing opening 144. For example, to support the telecommunications module 20, an antenna may include two separate antenna portions that are formed as quarter wave strips resembling inverted triangles or wedges to function as a broadband antenna. Such a construction may also necessitate a localized metallic coating within a portion of the skyward facing opening 144 to serve as the ground plane for this antenna. To support the navigation module, the included GPS antenna may be of a simple patch construction formed of an electrically conductive material placed on substrate. Dual band cellular antennas may be also configured as having a similar broadband structure including two wedge-shaped strips. If the antenna array structure is formed on a substrate, to increase the reception area of the array, the size of the antenna array 28 may be extended across the width of the upper portion of the windshield as indicated at 160 in FIG. 4. This area 160 may be left transparent, or may by covered by a further extension of the headliner 132, or by a widening of the extension 136 of the overhead console 130. It should be appreciated that almost any manner of antenna construction may be incorporated in the present invention and easily fit within the extended portion 136 of the overhead console 130 and that the choices of the type and style of antenna used in the antenna array 28 is a design consideration for the vehicle manufacture and does not limit the scope and intent of the present invention described herein.

As illustrated in FIG. 5, the overhead console 130 of the present invention provides the antenna array 28 with a full-time skyward exposure while housing the array within the vehicle interior and thereby avoiding any impact upon the shape, the aesthetics, or the styling of the vehicle. Further, the placement of the antenna array 28 within the overhead console 130 isolates the antennas from any metallic portions of the vehicle body 134 and its associated trim pieces as shown.

Accordingly, by having an antenna array that is housed in an overhead console and exposed skyward through the upper portion of the windshield, the present invention provides a vehicle information display and communication system that maintains constant contact with the GPS navigational reference, microwave communication, and all other forms of interactive communication that are installed in the vehicle. Further, the placement of the antenna array is such that it is unobtrusive, generally hidden, and does not extend into the outer surface of the vehicle, thereby preserving the vehicle's styling and aesthetics.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A vehicle information system having a plurality of operative modules, said system comprising:
    a control processing unit adapted to provide an interface among said plurality of operative modules, said operative modules include a display module adapted to provide visual information to the occupants of the vehicle, a navigation module adapted for global positioning satellite reception to provide vehicle position information to said control processing unit, a telecommunications module adapted for wireless communication to provide communication between said control processing unit and a wireless telecommunications network and between said control processing unit and any one of a plurality of local wireless devices, and a local network interface module adapted to provide communication between a vehicle control bus and said control processing unit; and
    an antenna array including a GPS antenna mounted in an overhead console, said overhead console adapted to extend forward over the upper edge of the vehicle windshield such that said GPS antenna maintains line-of-sight with at least one global positioning satellite transmitter at all times.

2. A vehicle information system as set forth in claim 1 wherein said antenna array further includes a microwave antenna that operatively communicates with a cellular network using a standard cellular mobile communication format.

3. A vehicle information system as set forth in claim 1 wherein said antenna array further includes an antenna that operatively receives a standardized communications format to provide satellite radio reception.

4. A vehicle information system as set forth in claim 1 wherein said antenna array further includes an antenna that operatively receives a standardized communications format to provide television reception.

5. A vehicle information system as set forth in claim 1 wherein said system further includes:
   a microphone system adapted to receive voice signals from vehicle occupants;
   a speaker system adapted to generate audio signals from said control processing unit; and
   an audio conversion module having a voice recognition circuit and a voice synthesizer circuit, said voice recognition circuit adapted to receive voice command from said microphone system, recognize particular predetermined voice commands as being one of a group of predetermined commands and to pass said recognized commands to said control processing unit, said voice synthesizing circuit adapted to process signals from said control processing unit and synthesize said signals into intelligible audio output signals and to pass said audio output signals to said speaker system.

6. A vehicle information system as set forth in claim 1 wherein said telecommunications module system further includes a short-range wireless RF transceiver module that operatively employs a Bluetooth standard telecommunication protocol.

7. A vehicle information system as set forth in claim 1 wherein said control processor unit further includes a memory module adapted to provide the necessary memory storage space for said control processing unit to operatively control the processes of said plurality of modules and to store a navigational database.

8. A vehicle information system as set forth in claim 7 wherein said navigational database may be stored in said memory module by downloading said navigation database from an outside source through a wireless telecommunication connection.

9. A vehicle information system as set forth in claim 7 wherein said memory module further includes a fixed portion and a removable portion, said removable portion adapted to be interchangeable with like removable portions so as to allow the use of different removable memory portions having different stored navigational databases, said removable memory portion further adapted to be interchangeable with like removable portions to allow a change in the size of the available memory.

10. A vehicle information system as set forth in claim 1 wherein said system further includes a keypad in operative communication with said control processor unit, said keypad adapted to allow a physical interface between vehicle occupants and said system.

11. A vehicle information system as set forth in claim 1 wherein said local network interface module further includes a local area network transceiver that operatively employs a CAN standard communication protocol.

12. A vehicle information system as set forth in claim 1 wherein said antenna array further includes a short-range wireless RF antenna that operatively employs a Bluetooth standard telecommunication protocol.

13. A vehicle information system as set forth in claim 1 wherein said display module is mounted in said overhead console and further includes a vacuum fluorescent display unit.

14. A vehicle information system having a plurality of operative modules, said system comprising:
   a control processing unit adapted to provide an interface among said plurality of operative modules, said operative modules include a vacuum fluorescent display module adapted to provide visual information to the occupants of the vehicle;
   a keypad in operative communication with said control processor unit, said keypad adapted to allow a physical interface between vehicle occupants and said control processing unit;
   a microphone system adapted to receive voice signals from vehicle occupants;
   a speaker system adapted to generate audio signals from said control processing unit;
   an audio conversion module having a voice recognition circuit and a voice synthesizer circuit, said voice recognition circuit adapted to receive voice commands from said microphone system, recognize particular predetermined voice commands as being one of a group of predetermined commands and to pass said recognized commands to said control processing unit, said voice synthesizing module adapted to process signals from said control processing unit and synthesize said signals into intelligible audio output signals and to pass said audio output signals to said speaker system;
   a navigation module adapted for global positioning satellite reception and having a navigational database to provide vehicle position information and location specific information to said control processing unit;
   a telecommunications module adapted for wireless communication to provide communication between said control processing unit and a wireless telecommunications network and between said control processing unit and any one of a plurality of local wireless devices;
   a local network interface module adapted to provide communication between a vehicle control bus and said control processing unit; and
   an antenna array including a GPS antenna mounted in an overhead console, said overhead console adapted to extend forward over the upper edge of the vehicle windshield such that GPS antenna maintains line-of-sight with at least one global positioning satellite transmitter at all times.

15. A vehicle information system as set forth in claim 1 wherein said antenna array further includes a microwave antenna that operatively communicates with a cellular network using a standard cellular mobile communication format.

16. A vehicle information system as set forth in claim 1 wherein said antenna array further includes an antenna that operatively receives a standardized communications format to provide satellite radio reception.

17. A vehicle information system as set forth in claim 1 wherein said antenna array further includes an antenna that operatively receives a standardized communications format to provide television reception.

* * * * *